Feb. 6, 1968    E. F. DE BONO    3,367,324
DEVICE FOR TESTING LUNG FUNCTION
Filed July 10, 1964

United States Patent Office 3,367,324
Patented Feb. 6, 1968

3,367,324
DEVICE FOR TESTING LUNG FUNCTION
Edward Francis De Bono, Whittlesford, England, assignor to Airmed Limited, Harlow, England
Filed July 10, 1964, Ser. No. 381,789
Claims priority, application Great Britain, July 20, 1963, 28,801/63; Sept. 26, 1963, 37,842/63
3 Claims. (Cl. 128—2.08)

ABSTRACT OF THE DISCLOSURE

The device is designed for testing lung function by measuring the flow-rate of air at the mouth, and includes a whistle having a mouthpiece and a calibrated leak opening arranged to allow a proportion of the air flow at the mouth to pass through the mouthpiece without passing through the whistle so that a certain total air flow-rate within the capacity of human lungs is required to cause the whistle to sound, the leak opening being adjustable and marked with a calibrated scale, the whistle proper having a tubular body with the calibrated leak opening in its tubular wall cooperating with a calibrated scale, the mouthpiece being an open tube having telescopic engagement with the tubular body so that it occludes the leak opening to an extent which can be adjusted by sliding movement of the mouthpiece relatively to the body to vary the air-flow required to sound the whistle, and the whistle proper consisting of a tube closed at one end by two end plates separated by a space, each end plate having a central orifice.

---

This invention relates to a device for testing lung function by measuring the flow-rate of air at the mouth.

There is a need for a cheap, simple, readily portable device for making such measurement with sufficient accuracy for clinical use.

The device according to the present invention comprises a whistle having a mouthpiece and a leak opening arranged to allow a proportion of the air flow at the mouth to pass through the mouthpiece without passing through the whistle so that a certain total air flow-rate within the capacity of human lungs is required to cause the whistle to sound. By making the leak opening adjustable the device can be adapted to enable the air flow-rate required to be varied over a required range.

Figure 1:
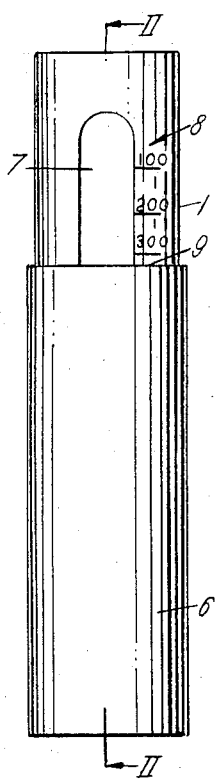
Figure 2:
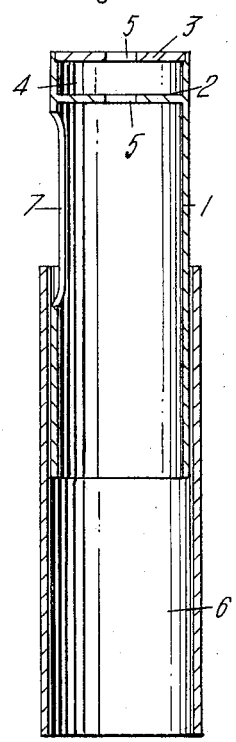

The invention and its subsidiary features will be fully understood from the following more detailed description by way of example of one embodiment thereof, reference being made to the accompanying drawing in which:

FIGURE 1 is a front elevation of the device, and
FIGURE 2 is a section taken on the line II—II of FIGURE 1 in the direction shown by the arrows.

In the construction shown in the drawing the whistle proper has a tubular body 1 about one inch in diameter closed at one end by two end plates 2 and 3 separated by a space 4 and each pierced with a central orifice 5. This whistle is designed so that it will sound only when the flow-rate through the whistle itself exceeds a value somewhat lower than the minimum flow-rate to be measured. This value may conveniently be fifteen litres per minute.

The device has a mouthpiece consisting of an open tube 6 having telescopic engagement with the body 1 as shown. The body 1 is formed with a leak opening consisting of a longitudinal slot 7 in its tubular wall, the construction being such that the slot 7 can be occluded to a variable degree by sliding the mouthpiece 6 on the body 1. The leak opening 7 thus variably increases the total rate of flow of air at the mouth required to cause the whistle to sound. A scale 8 is marked on the body 1 so that the total flow-rate is indicated by the position of the end 9 of the mouthpiece relatively to the scale. The scale marked on the drawing is a scale of litres per minute.

In the use of the device for measuring peak expiratory flow-rate, the subject is asked to fill his lungs, close his lips around the open end of the mouthpiece 6 whilst maintaining the jaw in an open position, and exhale as rapidly as possible. The jaw can best be kept open by placing the teeth over the end of the tube. The first test may be made with the leak opening 7 closed or nearly closed and the size of the leak opening increased stage by stage by adjustment of the mouthpiece 6 during successive tests until a maximum expiratory effort can no longer effect a whistle. The expiratory flow-rate is then read off the scale 8 for the last position of the mouthpiece 6 at which a whistle could be produced. Alternatively, the first test may be made with a large leak opening and the size of the leak opening decreased stage by stage until a whistle can be effected.

The device may be used for making other tests. For instance it may be used for measuring peak expiratory flow-rate. It may also be used for measuring minimum vital capacity by determining the length of time during which the whistle can be sounded at low setting.

The whistle proper may be made of metal or a hard plastics material. If a plastics material is used it is convenient to make the end of the wall 2 integral with the body 1 of the whistle and to make the end wall 3 in the form of a separate disc which springs into an undercut groove provided for it in the end of the body 1.

The mouthpiece 6 is easily detachable from the body 1 and is preferably made of cardboard or other disposable material, thus enabling a fresh mouthpiece to be provided for each subject. The device can be made so cheaply as to be wholly disposable and to encourage the provision of a fresh complete device for each subject.

I claim:
1. A device for testing lung function comprising a whistle having a mouthpiece and a calibrated leak opening arranged to allow a proportion of the air flow at the mouth to pass through the mouthpiece without passing through the whistle so that a certain total air flow-rate within the capacity of human lungs is required to cause the whistle to sound; the leak opening being adjustable and marked with a calibrated scale to enable the air flow-rate required to be varied over a required range; the whistle proper having a tubular body with the calibrated leak opening in its tubular wall cooperating with the calibrated scale, the mouthpiece being an open tube having telescopic engagement with the tubular body so that it occludes the leak opening to an extent which can be adjusted by sliding movement of the mouthpiece relatively to the body to vary the air flow-rate required to sound the whistle; and the whistle proper consisting of a tube closed at one end by two end plates separated by a space and each having a central orifice.

2. A device as claimed in claim 1 wherein the mouthpiece is readily detachable from the whistle and is made of cardboard or other disposable material.

3. A device for testing lung function comprising a whistle body having a whistle at one end, the other end being open; a mouthpiece having a telescopic engagement with the body; the wall of the body having a calibrated leak opening intermediate its ends arranged to be occluded to a variable degree by sliding the mouthpiece on the body to allow a proportion of the air flow at the mouth to pass through the mouthpiece without passing through the whistle, whereby a certain total air flow-rate within the capacity of human lungs is required to cause the whistle to sound, the leak opening being marked with a calibrated scale.

References Cited

UNITED STATES PATENTS 1,397,263   11/1921   Carmody _____ 46—179

FOREIGN PATENTS 612,126   11/1948   Great Britain.

RICHARD A. GAUDET, *Primary Examiner.*

SIMON BRODER, *Examiner.*